US008842156B1

(12) United States Patent
Alekhin

(10) Patent No.: US 8,842,156 B1
(45) Date of Patent: Sep. 23, 2014

(54) UNIFIED INTERACTIVE VIDEO KIOSK FOR INFORMATION MANAGEMENT AND METHOD FOR THE SAME

(71) Applicant: Ivan Alekhin, Moscow (RU)

(72) Inventor: Ivan Alekhin, Moscow (RU)

(73) Assignee: NewTech Systems Inc, Irvine, CA (US)

( * ) Notice: Subject to any disclaimer, the term of this patent is extended or adjusted under 35 U.S.C. 154(b) by 0 days.

(21) Appl. No.: 13/931,084

(22) Filed: Jun. 28, 2013

(51) Int. Cl.
*H04N 7/15* (2006.01)
(52) U.S. Cl.
CPC ...................................... *H04N 7/15* (2013.01)
USPC ................. 348/14.02; 348/14.01; 348/14.08; 705/14.37; 705/304
(58) Field of Classification Search
USPC ........... 348/14.01–14.16; 705/304, 1.1, 14.37
See application file for complete search history.

(56) References Cited

U.S. PATENT DOCUMENTS

| 2005/0075907 | A1* | 4/2005 | Rao .................................... 705/2 |
| 2009/0222318 | A1* | 9/2009 | Anelevitz et al. ............... 705/10 |
| 2011/0161836 | A1* | 6/2011 | Mu et al. ........................ 715/756 |
| 2011/0261144 | A1* | 10/2011 | Benefield et al. ........... 348/14.08 |
| 2012/0170070 | A1* | 7/2012 | Sodhi et al. ................... 358/1.13 |
| 2012/0192084 | A1* | 7/2012 | Dura et al. ..................... 715/751 |
| 2012/0202471 | A1* | 8/2012 | Rochet ........................ 455/414.1 |
| 2012/0281253 | A1* | 11/2012 | Frank et al. .................. 358/1.15 |
| 2013/0159027 | A1* | 6/2013 | Naor et al. ........................ 705/5 |
| 2013/0173287 | A1* | 7/2013 | Cashman et al. ................. 705/2 |
| 2013/0173378 | A1* | 7/2013 | Scholes et al. ............. 705/14.39 |
| 2013/0268364 | A1* | 10/2013 | Gildfind ..................... 705/14.57 |

* cited by examiner

*Primary Examiner* — Melur Ramakrishnaiah
(74) *Attorney, Agent, or Firm* — Nadya Reingand; Yan Hankin

(57) ABSTRACT

More specifically, the invention describes a public standalone information access tool, such as bidirectional video terminal/kiosk for receiving a variety of services and for information exchange. The kiosk is connected to a plurality of remotely located representatives/operators specializing in different services. The customer receives help and share documents with at least one operator. The kiosk provides people from small remote villages an opportunity to receive all services available in a large city.

20 Claims, 8 Drawing Sheets

UNIFIED INTERACTIVE VIDEO KIOSK FOR INFORMATION MANAGEMENT AND METHOD FOR THE SAME

CROSS-REFERENCE TO RELATED APPLICATIONS

This patent claims priority to provisional application Ser. No. 61/779,322 filed Mar. 13, 2013 entitled "UNIFIED VIDEO TERMINAL FOR BI-DIRECTIONAL INFORMATION MANAGEMENT AND METHOD FOR THE SAME".

The described video kiosk design is disclosed in co-pending U.S. Design patent application No. 29/446,287 filed Feb. 21, 2013.

The iQube software used in the disclosed video terminal is Copyright registered in the U.S. Library of Congress, the Certificate of Registration No. TX 7-685-192, the effective date of registration is Feb. 20, 2013.

FIELD OF INVENTION

This invention relates broadly to the field of video-communication wherein an interactive network teleconferencing system is provided enabling one or more parties at one location to be in effective collaboration with a dedicated operator or one or more parties at another location.

More specifically, the invention is related to a public or private standalone information access tool, such as bidirectional video terminal (or kiosk) for information exchange. The kiosk includes a touch-screen display and can be used for information entering, representation, and a real-time collaboration. It can also be used in video teleconferencing, business operations/transactions, submitting Government-required documents as well as in variety of other applications. It includes a monitor-like interface having touch-screen controls and selectable features that are displayed at the screen along with information that specified by a particular application of the device.

The proposed invention is especially useful for rural territories where the local infrastructure does not have enough institutions, so such kiosk brings services available in a large city to a small village.

BACKGROUND OF THE INVENTION

Standalone video terminals have been popular for many years and these terminals continue to change as technology improves. The capabilities of such device expand as the cost of the computer components and memory decreases. A significant advance was made by adopting touch-screens as both an input device and an output display. Various applications are provided on device, including teleconferencing, email, telephone, calendar, to mention a few.

Although the field of video-communication has been under development for a while, a number of processes, procedures and interactive communications systems have certain disadvantages that become apparent when used in a wide variety of complex and ever-changing commercial environments.

Traditionally, interactive network teleconferencing systems (kiosks or video terminals) are incorporated into a wall structure, e.g., the exterior wall of a bank, and the public had access only to a front panel of the automatic machine. Standalone video terminals have usually been of a box-shape, generally, rectangular but the corners have been smoothed or a gentle curved transition introduced to improve the box-like appearance thereof. The computer control module is provided.

Typically, video terminals or kiosks include an opening access door to access the control module of the terminal. In addition, the financial transaction module, such as a card reader can be included to provide a credit card or smart card capabilities, typically also requiring a communication capability for the terminal.

Certain embodiments of such a kiosk may provide a specific customer with a plurality of various services and information, see FIG. 1 for example.

There is an unmet need for a more versatile and unified kiosk system having the capability of providing users with a wider variety of services and information. Existing kiosks and terminals have limited capabilities over the growing requirements for ever-growing number of potentially available services.

Furthermore, the present invention provides a modern appearance that reflects a significant technological advancement.

SUMMARY OF THE INVENTION

An interactive multimedia system is disclosed. The networking system includes at least one kiosk connected to a plurality of remotely located representatives/operators located at different places. Such kiosk provides a public customer with various information and multiple services and includes at least a keyboard, a touch screen, a camera, a microphone and a credit card reader. The customer is able to select particular services using the touch screen. Upon selection, customer is provided with help options and a set of instructions and service-relevant documents that can be downloaded using a network connection. The kiosk can also send and receive emails or SMS messages, as well as provide signing, identification and/or gesture recognition means to the customer. Moreover, the kiosk can provide means for the remote storage of the data that is related to a particular customer and protected by a password. The kiosk can also provide means for an emergency response, when needed.

Activating a help option establishes a connection between the kiosk and a corresponding operator's station from the plurality of operators. The operator's station includes an operator, a computer, a camera, a microphone and an interface allowing control of customer's access to the kiosk. The operator performs the service which is relevant to the customer's selection and the image from the operator's camera is transmitted to the kiosk's screen. Meanwhile, the kiosk's camera provides the first operator with an image of the customer and the network provides a secure communication between the kiosk and all operator's stations involved into the communication. Thus, the customer has an illusion that he/she is present in a facility associated with this kind of service, for example, an investment professional, or a tax lawyer, or other service, which is not available in his rural area.

Upon completing the documents required for the first selected service, the operator is capable of seeing a progress via the operator's interface. Moreover, the operator is able to provide vocal instructions to the customer or complete the documents her-/himself, accordingly to the customer's instructions by sharing the document on the kiosk's screen and the operator's screen.

The customer can select a next service from the list; activate a second help option, thus engaging another operator, who is specifically relevant to the next service chosen. In general, each operator can be located at a different place. By these means, the system allows the customer to complete a multitude of operations using a multitude of remote specialized operators. The operators can be engaged, for example, in general assistance, sale, tickets reservation or information providing. The list of pre-selected products and/or services can also be provided for a customer, thus enabling the customer to select a particular provider based on a certain criterion, such as cost, distance from the customer, etc. The services may include ones provided by the governmental offices, also operating at the times when such offices are closed for the general public.

The disclosed system can further provide a connection between different operators, such as an option to connect the customer to the second operator by the first operator. In such situation, the images of the first and a second operator are displayed on the kiosk's screen and the customer performs teleconference with a few operators at the same time, optionally sharing the same documents between operators and the customer.

The kiosk also provide WiFi area, which allows other customers to receive full service available at the kiosk via WiFi connection.

DETAILED DESCRIPTION OF THE INVENTION

Figure 1:
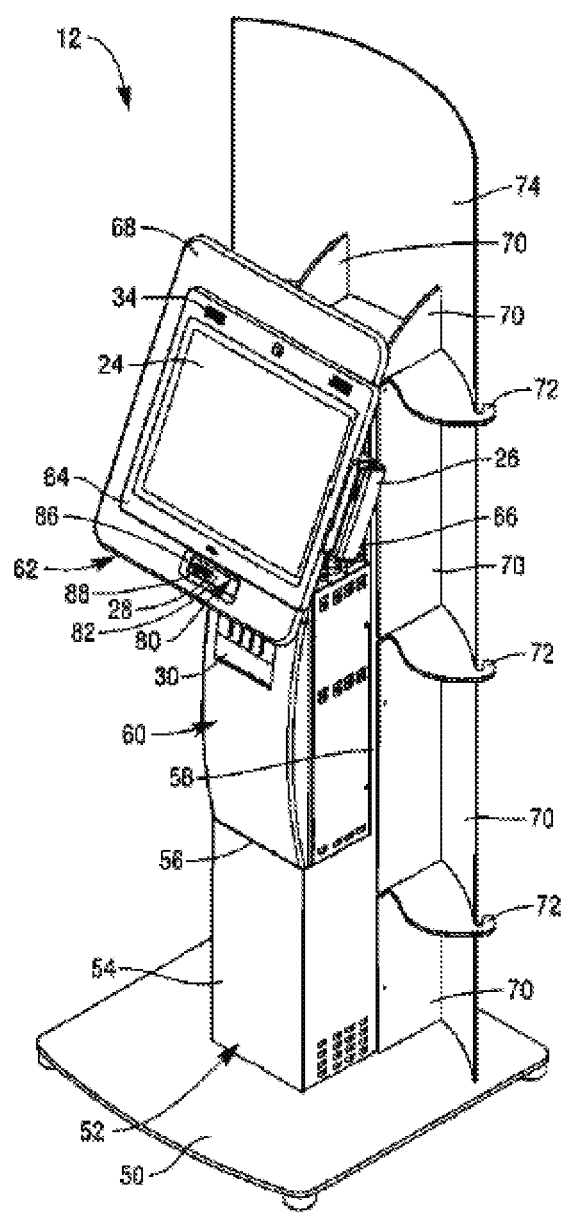
FIG. 1. A standalone video kiosk, Prior Art.

The invention discloses and interactive system and method for a location-distributed plurality of kiosks (in a public places, service targeted locations, etc.) serving a multiple customers (hereinafter a Customers' Pool) at different locations of the kiosks (i.e. the Kiosk's Pool).

To provide a plurality of customers (i.e. Customers' Pool) with a wide variety of tasks and services (hereinafter Tasks) that can be administered separately and remotely by a plurality of unique distributed operators (i.e. the Operators' Pool). The Tasks and services may further include the following features.

One of the preferred applications of the disclosed invention is in multiple video teleconferencing. Yet another preferred application is customer remote video assistance, consulting and advisory.

A videoconferencing capability enables operator of providing a virtual face-to-face assistance to the customer. Moreover, certain embodiments of the kiosk provide a specially adapted interface allowing the customer to interact with an operator. Moreover, a various number of additional (also third-party) services, are included into the kiosk capabilities, for example: ticket reservation, various payment means and databases access, etc.

Communication between video terminals constitutes the video teleconferencing. The video teleconference terminal is capable of entering handwritten characters and drawings, displayed by a touch-screen. A video scanner produces documents soft-copies with the characters and drawings entered and displayed. The documents can further be transmitted using built in terminal capabilities. Voices of participants (e.g. customer and operator) are received by a built-in microphone, while pictures and video of the participants are captured by the built-in camera. Still pictures of documents and small solid objects can also be captured by the camera.

During the conference, the operator may request information from the customer and vice versa, using the built-in capabilities and software applications available at the video terminals. The invention allows a user of the terminal to hold a video conference not only with the dedicated operator, but with any other suitable facility, such as a properly equipped personal computer, tablet or cell-phone, for example.

Video terminals can be subject to substantial abuse and thus require a robust construction to reduce service requirements and provide in an appropriate product life.

The present invention provides an innovative approach towards standalone video terminals concept, including expended functionality and effective space utilization. In a preferred embodiment of the invention, the modules of the terminal are partially overlapped, having more effective space utilization by the terminal. It also provides an effective protection of the various modules of the terminal while maintaining its functionality.

Moreover, the present invention offers a network tool connecting a plurality of unique parties, such as customers and operators, to provide a wide variety of services based on targeted task-based information. A unique software iQube provides connection between plurality of the kiosks and operators in various locations thus enabling customers to exercise a remote electronic communication with any number of remote operators if needed, depending on the task or service required.

Connected customers and operators can simultaneously process customer's task, for instance through a task-based image on the shared interface screen. A specific operator (or its combination) is capable to administer the service that being required by a specific customer using additional services (also third-party services), if needed. Both, customer and operator(s), are capable remotely add, remove, or change the content and services that are available at each kiosk. In the preferred embodiments of the invention, the operator (or combination of operators) may also remotely monitor customer's activity at the kiosk.

One or more operators may also be in a remote electronic communication with the kiosks and their customers, with each other, and with the third parties, if required, to monitor and administer the tasks of the customer.

The main features and operational capabilities are as follows (can be used in combination): 1) The option of placing a video call by a user of the invention (a customer) to the operator's (i.e. assistant) workplace (i.e. station); 2) The option of supporting on-hold calls when all available operators are busy; 3) Supporting a service queue of kept on-hold-customers; informing users of the operator status and availability; 4) The option of recording and overview of audio/ video conversations, including graphical and text information being transferred by operator to user during the call; 5) The option of forwarding calls to another operator or group of operators; 6) The option of a real-time interactive communication between the operator and the customer based on a real-time information transferring between the customer and the operator, including audio communication, and/or images and texts transferring and sharing.

Yet another application of the invention includes: 7) A real-time collaboration on documents, such as a real-time automatic representation of the data filled by operator and customer, particularly documents collaboration the touch-screen of the invention; 8) Ability to request the customer to enter required data or fill any required document or form; 9) Providing customer with an option of entering the required information using a on-screen keyboard; 10) Real-time operator's desktop presentation to the customer using the video terminal screen, including operator's cursor position; 11) The option to share the completed documents by an e-mail, FTP, including the option for third-party information system integration; 12) The option to provide customer with an interface to enable specific software applications, such as loan calculator, calendar, etc; 13) The option to evaluate the operator's performance by a customer; 14) The option to create customized individual scenarios, checklists and forms that can be used for customer service; 15) The option to send an SMS to the customer with a reference (e.g. link) to the audio/video dialogue; 16) The option of combining operators in groups by their qualifications; 17) The option to monitor the operators' current activity; 18) The option to review the performance statistics for a specific operator or a group of operators; 19) The customizing option for the video terminal GUI (graphical user interface); 20) The option for the customer's offline-forms filling (without video consultation); 21) The option for video identification, including biometrical identification; 22) The option for voice control; 23) The option for gesture recognition and control; 24) The option for document scanning; 25) The option for contactless payment processing, a payment card processing; 26) The option of using WiFi connection to the kiosk services.

A standalone kiosk or video terminal includes: the housing been defined as a vertically-oriented tower, the tower being a structural framework of the terminal; the tower integrating various cooperating modules of the terminal; the tower having a shape of a flattened, vertically extended box that is tilted back; the tower with a lateral width being mildly tapered (gradually decreased) towards the bottom and the top of the tower; the tower being made of a glossy material; the tower further comprising a front panel, a back panel, side edges, a top edge and a flat floor panel, i.e. base; the base having a flat rounded rectangular shape; the flat rounded shape with front and rear convex sides; the base made of the metal or panel of uncoated glass; chassis being mounted on the base having front and rear supporting elements; the supporting elements being separated laterally, also having vertically oriented grooves; a locking device being located at the back of the rear supporting elements. the tower being placed on the top of the base that being located on the flat floor; the tower having a space of 1-5 inches between the base and the tower bottom, the space going around the front panel, the back panel and the side edges; the tower further comprising a touch-screen input/output module with the a touch-screen being located at the front panel for displaying and entering information; the tower front panel being covered by a smooth cladding surface, slightly protruding beyond it; a swing door opening at the front panel of the tower, the tower back panel being covered by a smooth veneer cladding, slightly protruding beyond it; an air vent opening at the top of the back side panel of the tower.

In the preferred embodiment of the invention, a disclosed kiosk/video terminal as claimed wherein a touch-screen input/output module connected with an audio output, wherein said audio output is an acoustic system with a speaker. The said audio output directs an output signal towards the user. There are supports for the grids at the sides of the back tower panel; the grids being used for the acoustic system speaker's support.

In the preferred embodiment of the invention, there are vertically oriented hinges at the side edge of the tower; the tower further comprising the card-reader module (such as a payment receiving module) with horizontal slit, being located at the front panel, below the screen, alone the front panel vertical line of symmetry; the card-reader module having a decorative lighting unit framed with a bezel;

In the preferred embodiment of the invention, the tower further comprises the scanner module. The presence of the scanner module is located directly below the card-reader module slit, the scanner module being symmetrical alone the front panel vertical line of symmetry; the scanner module being visually highlighted by a spotlight having a rectangular shape.

Figure 2:
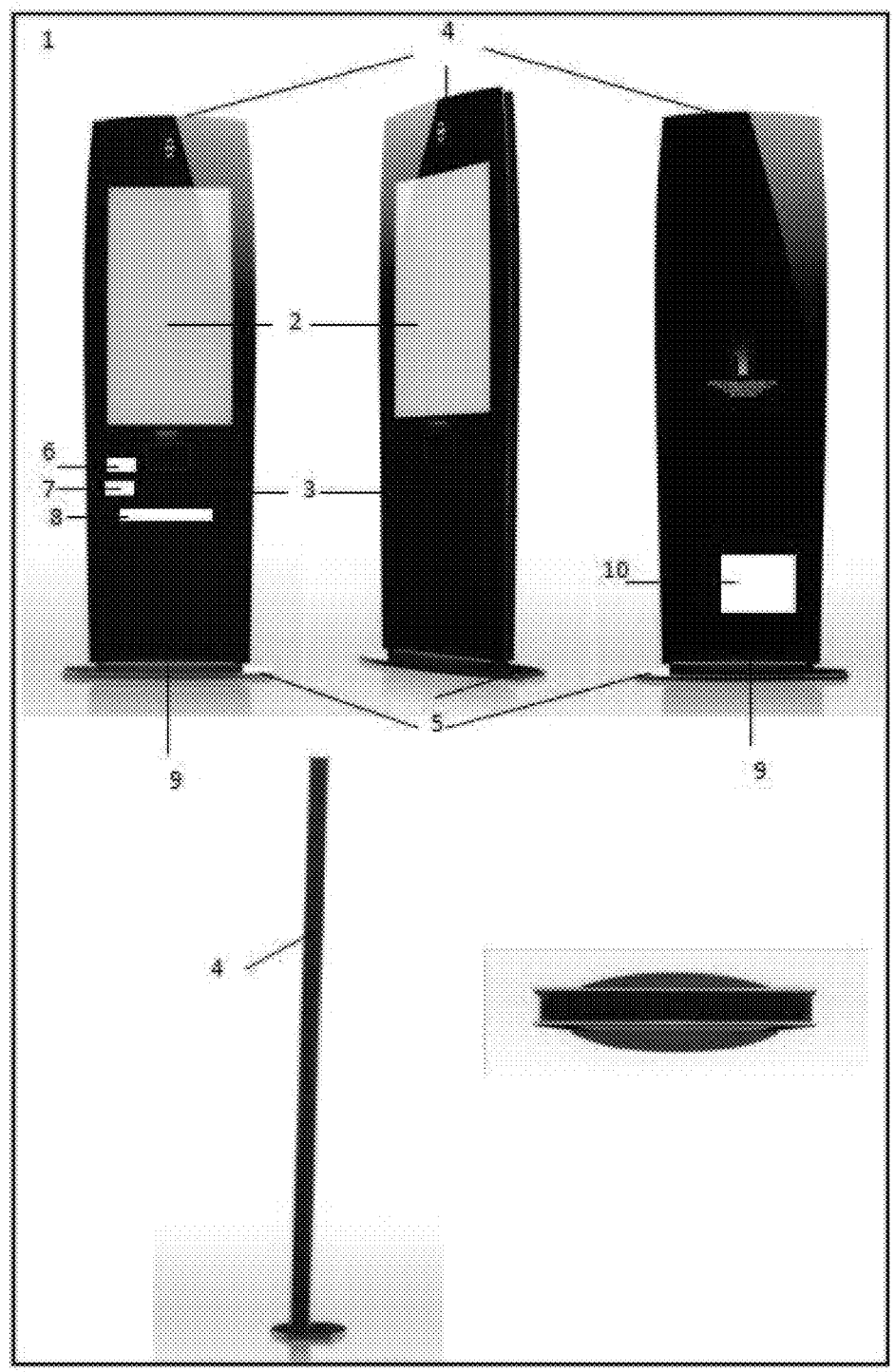
FIG. 2. A standalone video terminal/kiosk. The perspective views of the device are shown: a, b—is a front view, c—is a back view, d—is a side view and e—is a view from the top.

The disclosed device is shown in FIG. 2 where the 5 different perspective views are presented, namely, a, b—is a front view, c—is a back view, d—is a side view and e—is view from the top. The invention can be attached to computers, used as standalone devices or connected to a network. The invention allows the user to interact with the device directly and without any controlling equipment such a computer mouse, keyboard or a stylus. The principle of operation of the disclosed device is similar to touch-screen ATMs or cash registers. The tower includes and protects the computer module, the touch-screen module, acoustic module and other optional modules such as financial transaction module, card reader module, lighting module, scanner module, etc.

As shown in FIG. 2, a standalone video terminal/kiosk, has a touch-screen 2 integrated into a front panel 3 of the tower 4, standing on the base 5. The front panel is covered with a smooth cladding surface. The terminal 1 includes a camera 6, card reader 7 slot and a scanning module 8 provided beneath the touch-screen and above the base unit 5. This space is advantageously used to provide audio output 9. A tower support chassis 9 are attached to the base 5. An access panel 10 is located at the rear of the tower, which is removable by opening of the attached key lock.

The standalone kiosk/video terminal shown in FIG. 2 also provides a video camera at each terminal for communicating party, the camera configured to capture images and video. The video and audio capture device may include one or more switches for securely activating and deactivating the device. The video and audio capture device may also be integrated into a single unit.

The standalone kiosk/terminal shown in FIG. 2 includes data input and output means (not shown) to facilitate interaction and communication between the particular customer at the particular kiosk, and operator (or its combination), through the network. Input means may include, computer peripherals, for example, one or more touch-screens, buttons, keyboards, cameras, motion sensors, microphones, proximity sensors, switches, wireless antennas, card/magnetic strip readers, as well as video conferencing means.

Moreover, the standalone kiosk/video terminal shown in FIG. 2 with a disclosed structural framework not only provides an elegant design but supports operation in demanding environments such as crowded public facilities, museums, airports, etc. The modular, assessable design still allows effective service should any of the modules require service or replacement. The sound is transmitted into the gap and to the front of the front panel. This position hides the speaker and reduces the probability of vandalism.

Furthermore, the standalone kiosk/video terminal shown in FIG. 2 can be used as a teleconference system and method in which an initiator of a teleconference (a customer) sends a request or instructions to the operator using the communication capability of the terminal. The video terminal can communicate with the intended operators or other participants using basic communication tools that are generally available.

Figure 3:
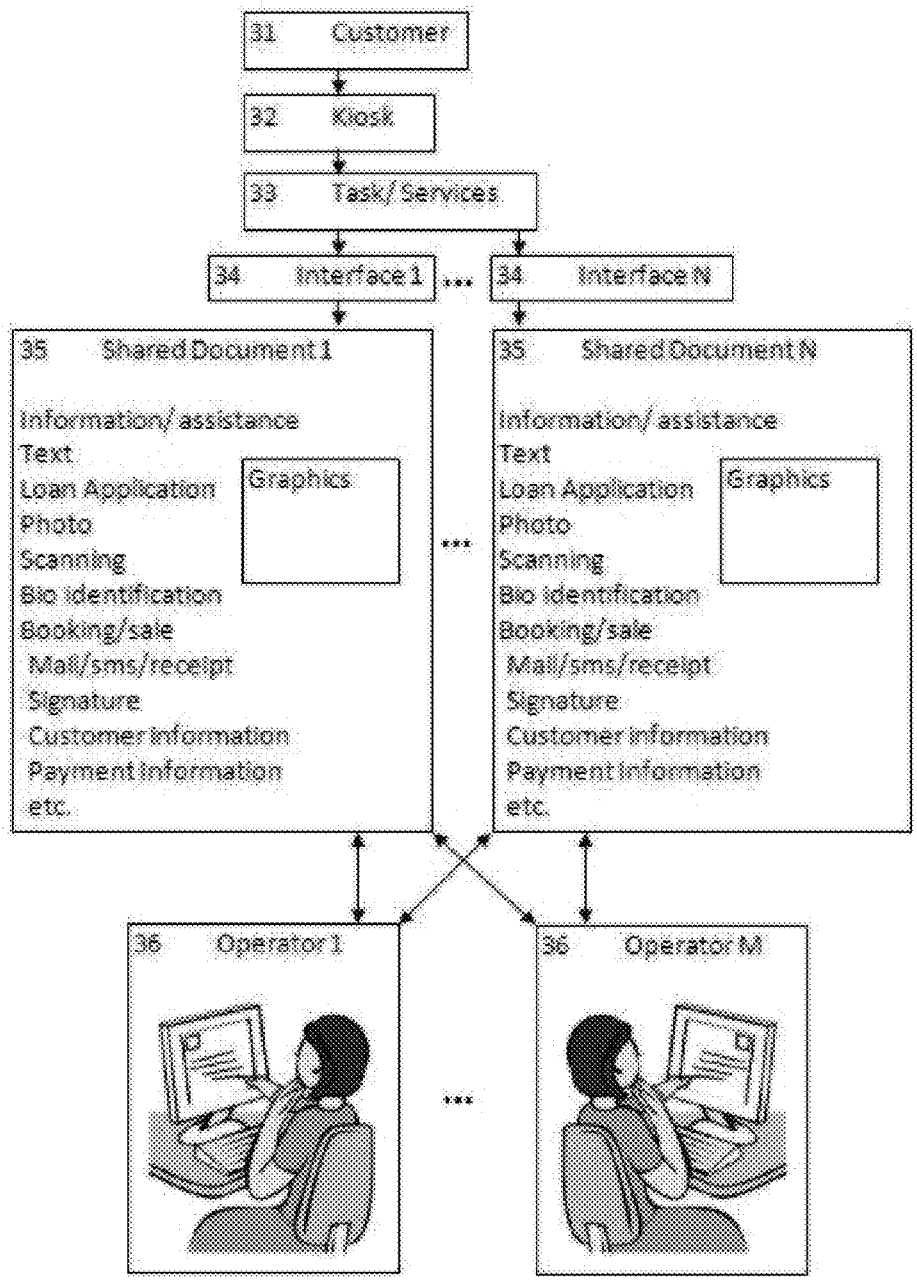
FIG. 3. An example of the interactive kiosk system based on a single standalone video terminal/kiosk and plurality of operators.

FIG. 3 shows an example of the interactive kiosk system based on a single standalone video terminal/kiosk (as shown in FIG. 2) and a plurality of operators (Operators' Pool). With the reference to the FIG. 3, the system includes a kiosk 32 adapted to provide individual public customers 31 based on her/his location, with information and/or services provided by the unified set of interfaces 34 (Interfaces' Pool).

Each customer 31 can use a single kiosk 32 based on the location (proximity) of the customer 31 and the kiosk 32. In the preferred embodiment of the invention, the operator 36 (or several operators) can be automatically (or manually) chosen based on the combination of the Tasks preferred by the particular customer 31 and supported by the interfaces 34. An interactive videoconferencing capability is provided through the kiosk 32 in such a manner that that a chosen operator 36 (or combination of the operators 36) can provide a virtual face-to-face assistance to a particular customer 31 at the particular customer location through the particular kiosk 32. The face-to-face assistance includes a sharing of the variety of the documents 35 depending on the tasks selection, including modification of the shared documents by all parties (at their respective screens) involved in the communication (i.e. a customer 31 and operator(s) 36) and providing a vocal instruction by such parties.

Kiosks 32 can be placed at any location, including but not limited to rural areas, shopping malls/centers, airports, hotels, hospitals, stores, sporting event locations, convention centers, businesses, restaurants, retail stores, banks, public transportation areas, schools, or mobile locations.

In preferred embodiment of the invention, the kiosk 32 provides a plurality of interfaces options 34 each being adapted to allow the particular customer 31 to perform a particular Tasks of choice (or combination of such Tasks) and interact with the chosen operator 36 (or combination of operators 36) in a real time.

Figure 4:
FIG. 4. An example of the interactive kiosk's front panel touch screen view with a plurality of optional interfaces offered to the customer.

FIG. 4 shows a view example of the interactive kiosk's 32 front panel touch screen (as explained in FIG. 2) with a plurality of optional interfaces 34 (as explained in FIG. 3) offered to the customer.

Figure 5:
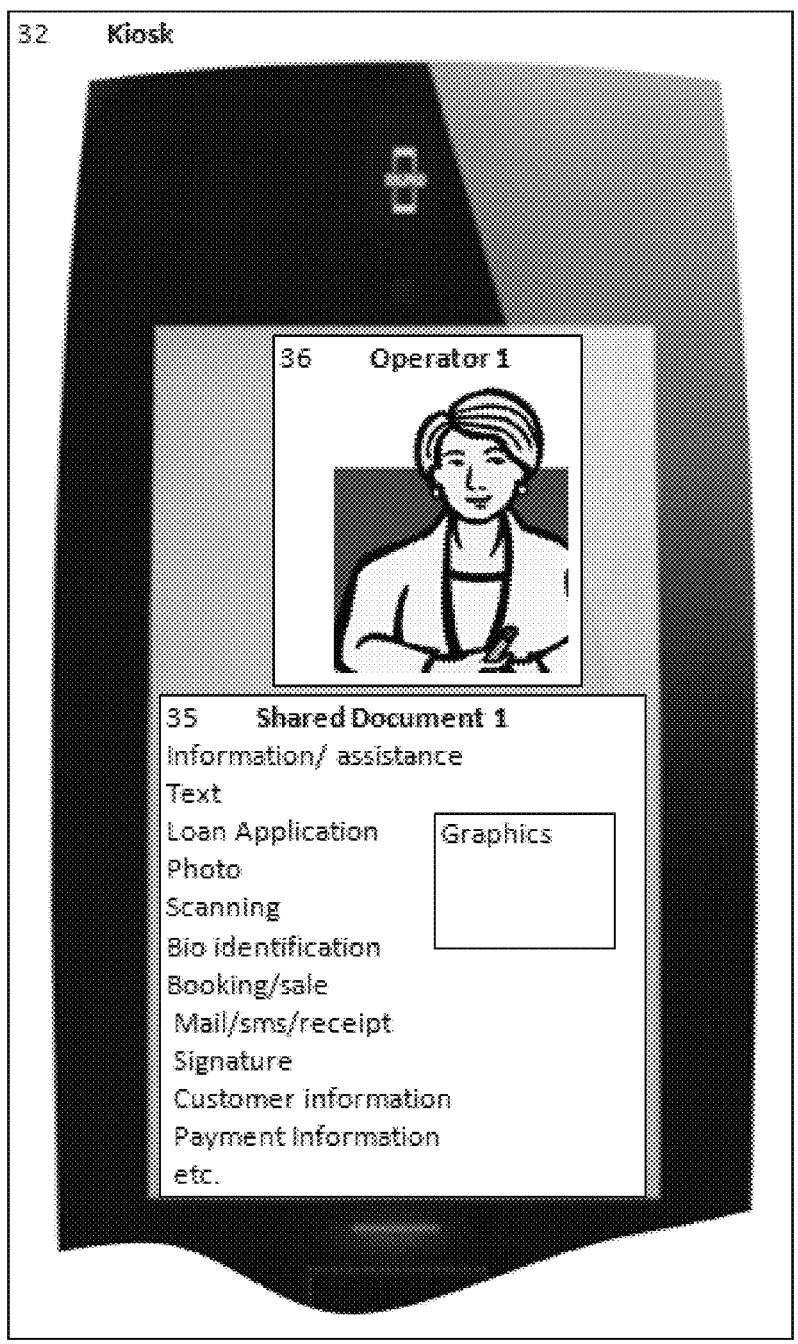
FIG. 5. An example of the interactive kiosk's front panel touch screen view with an optional document that can be offered to the customer depending on the services selected and be shared with an operator in a real time.

The invention distributes data to all parties involved in the communication from which each party can generate a display containing the common image, document, its modifications, and the video. FIG. 5 shows a view example of the interactive kiosk's 32 front panel touch screen (as explained in FIG. 2) with a plurality of optional shared documents 35 (as explained in FIG. 3) offered to the customer. The disclosed invention enables customer 31 and operator(s) 36 at different locations to collaborate on and modify a shared document at their respective screens. The assistance and modification of the documents is provided by a real-time teleconferencing session with an operator 36. As shown schematically in the FIG. 5. Both operator 36 and a customer can share the chosen document at their respective screen.

With the reference to the FIG. 5, the operator 36 of the teleconference can send the visual and audio information through the network, and create notification messages/logs for the intended customer(s). Such information may include unique information associated with the customer 31. Teleconferencing may involve multiple customers/operators connected to the same communication channel, allowing each customer to communicate (also to each other).

Any person/customer 31 located near the standalone kiosk/video terminal 32 can issue commands to any application program supported by the device, for example, hand-held calculator simulator, calendar, photo service, email, scanner, etc. For example, if the customer 31 presses the "Button" on the Calculator application on a touch-screen of the respective kiosk 32, then each Calculator application at the respective operator(s) 36 display would show the same "Button" in response. In other words, the Calculator program does not care which user pressed the buttons, nor whether some users pressed no buttons, provided a legal sequence of buttons was received by the cooperative users. The same principle is applicable for any software application (from the Interfaces' Pool 34) supported by the invention.

Moreover, any customer 31 can draw on the user's respective local display, using typing, editing or drawing software tools applied to the touch-screen. The user can also erase or delete items on the display if necessary. Accordingly, the invention can replicate the customer's annotations on all other displays involved, so that all communicating parties view similar results. Users can also take an action by using their respective cursors on the touch screen, and others party will see the movement, allowing remote pointing.

In general, the displays could be different for different users (e.g. customer 31 and the operator 36), but the basic content of all displays is the same. To accommodate size differences, for example, the invention rescales the images as appropriate.

Moreover, a customer 31 can annotate the local display or use additional data and/or application that can be kept private for a user or operator by desire during the communication session.

Figure 6:
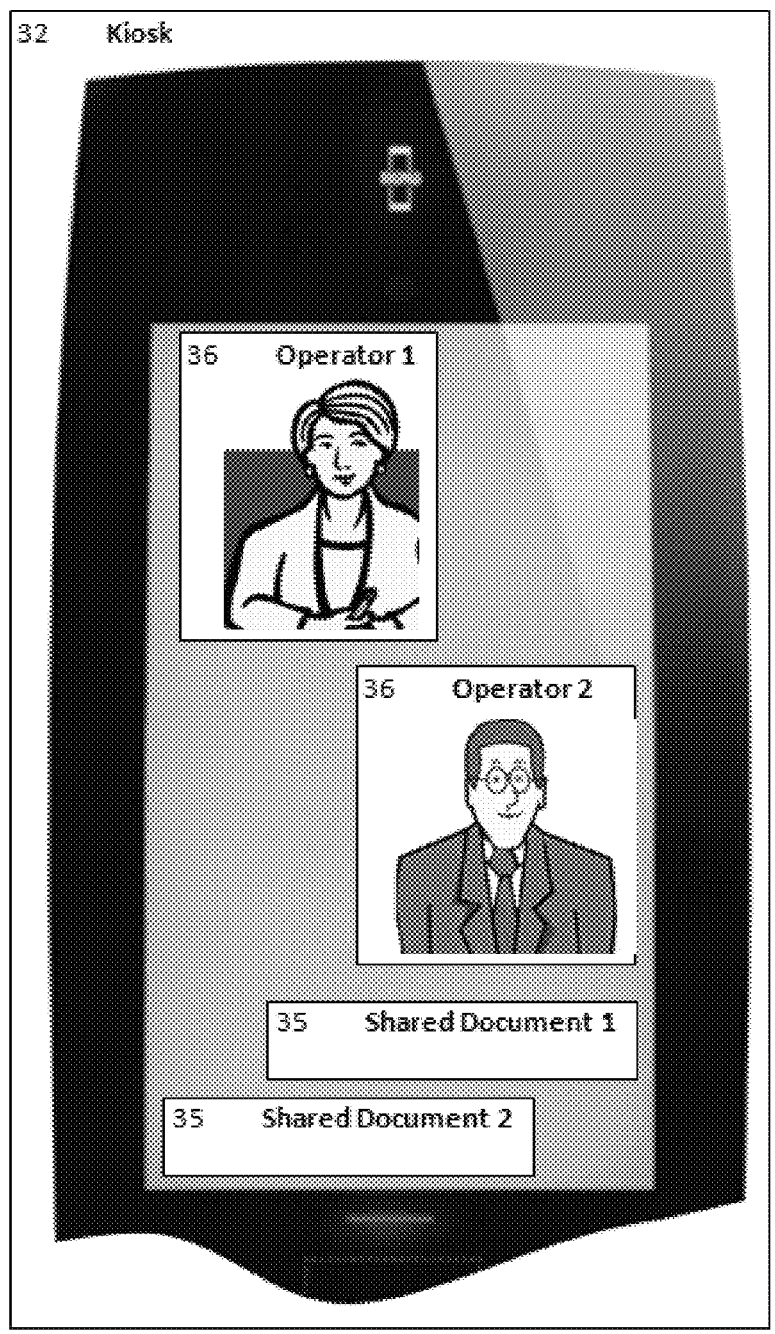
FIG. 6. An example of the interactive kiosk's front panel touch screen view with a plurality of optional documents that can be offered to the customer depending on the services selected and be shared with multiple operators in a real time.

Moreover, the disclosed system can further provide a connection between different operators, such as an option to connect the customer to the second operator by the first operator. In such situation, the images of the first and a second operator are displayed on the kiosk's screen and the customer can perform teleconference with a few operators at the same time, optionally sharing the same documents between operators and the customer. FIG. 6 shows a view example of the interactive kiosk's 32 front panel touch screen (as explained in FIG. 2) with a plurality of optional shared documents 35 (as explained in FIG. 3) offered to the customer, where more than one operators 36 are involved into the teleconferencing, sharing (modifying) more than one documents 35 on their respective screens.

In yet another application, the standalone kiosk/video terminal 32 can play the role of a monitoring device with emergency response capability. It can play a role of the remote video terminal for real-time spot-of-interest monitoring, also capable of responding to customer emergency call or engaging an emergency response protocol in autonomous fashion.

Figure 7:
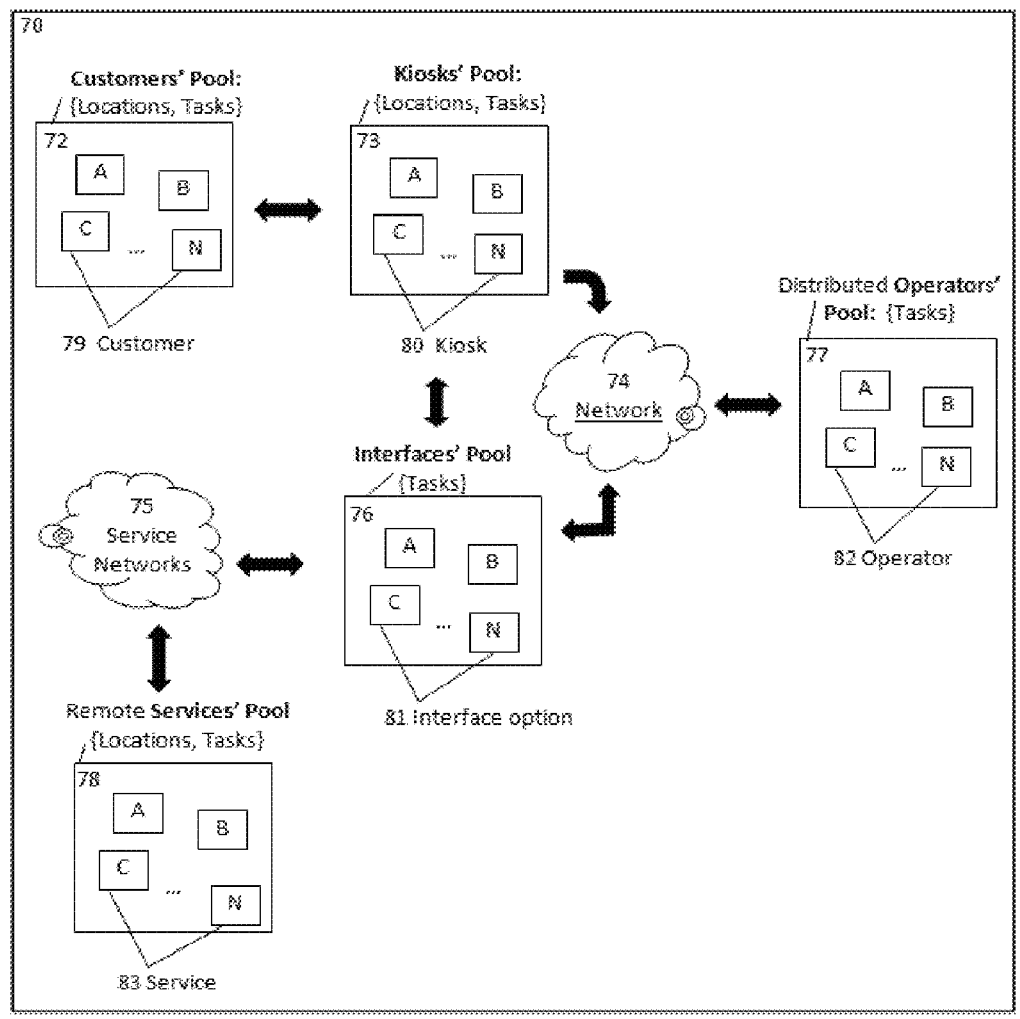
FIG. 7. A general example of the interactive kiosk system based on the plurality of kiosks and plurality of operators.
Figure 8:
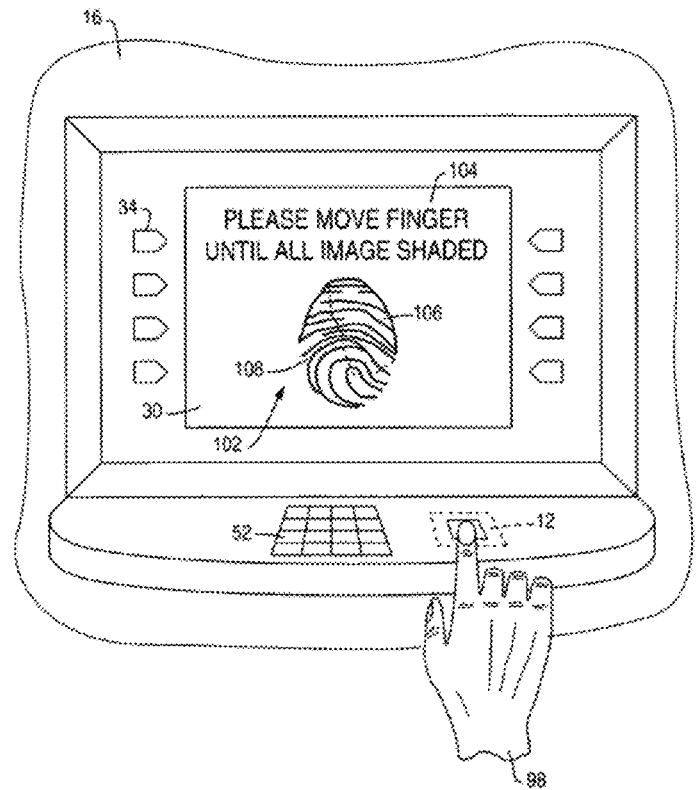
FIG. 8. Prior art. The optional biometric identification embodiment.

The FIG. 7 provides a more general understanding of the interactive kiosk system based on the configurations explained in FIG. 2-FIG. 6. In general, the disclosed system is based on the plurality of kiosks and plurality of operators. With the reference to the FIG. 7, the system 70 includes one or more kiosks 80 (from the Kiosks' Pool 73) adapted to provide individual public customers 79 (Customers' Pool 72)

based on their locations, with information and/or services provided by the unified interface options 81, (Interfaces' Pool) 76. As mentioned, kiosks 80 can be placed at any location.

Each customer 79 can use a single kiosk 80 from the Kiosks' Pool 73 based on the location (proximity) of the customer 79 and the kiosk 80. In the preferred embodiment of the invention, operator 82 from the Operators' Pool 77 can be automatically (or manually) chosen based on the combination of the Tasks preferred by the particular customer 79 from the Customers' Pool 72 and supported by the Interfaces' Pool 76.

An interactive videoconferencing capability is provided through the Kiosks' Pool 73 so that a chosen operator 82 (or combination of the operators from the Operators' Pool 77) can provide a virtual face-to-face assistance to a particular customer 79 from the Customers' Pool 32 through the particular kiosk 80 at the particular customer location.

In preferred embodiment of the invention, each interactive kiosk 80 from the Kiosks' Pool 73 provides a plurality of interface options 81 (from the Interfaces' Pool 76) each being adapted to allow the particular customer 79 to perform a particular Tasks of choice (or combination of such Tasks) and interact with the chosen operator 82 in a real time.

In the preferred embodiment of the invention, a plurality of (optionally third-party, remote) services 83, combined into a remote Services' Pool 78 can be provided by each kiosk 80 from the Kiosks' Pool 73, based on such kiosk location and the combination of Tasks chosen by the particular customer 79 connected to the kiosk 80 or by an operator(s) 82, communicating with this customer 79.

Examples of remote services 83 may include GPS (or similar), WiFi, Bluetooth (or similar) communication means as well as third-party services using networks 75, such as cellular telecommunication, ATM network, ticketing, database access, etc.

As mentioned, the standalone kiosk/terminal 80 can be used as an information portal in any public place or commercial environment, where customer 79 can readily obtain all necessary information (video, audio, data) interactively. The customer 79 is also capable to exchange all information with the remote services using data entry functionality (camera, touch screen, smart card reader, scanner, etc.) of the terminal 80.

The ability to see and interact with different conference participants is essential to the conduct of any communication. Visual presence is one of the most important criteria a video conferencing system must satisfy. The disclosed invention has a capability to compensate for the "parallax effect" during the customer-operator communication, if required. The parallax effect prevents the appearance of eye contact between the speaker and those remote viewers to whom he or she is speaking and results, generally, from the placement distance of the camera relative to the monitor and viewer. The parallax correction can be realized similar to U.S. Pat. No. 5,500,671 or by alternative methods, enabling an eye contact and a sense of presence to the customer-operator communication.

The invention as a system and a method can combine multiple video-communication services and multi-media access for diverse customer appeal. The system and method employ a number of the disclosed standalone video terminals, communicating with the dedicated information portal, between each other, or providing a general multi-media access such as satellite TV, cable, broadcast TV, computer programs, interne access and gaming. It allows media uses and various management capabilities such s scheduling, accounting, security, training and the like.

Furthermore, the present invention provides a gaming platform where the standalone video terminal provides game-related video and sound generating electronics, and utilizing a vertically oriented video screen having touch video screen input as a player interface to the device, and optional pay-out mechanism. The standalone video terminals can be used as gaming devices, for example for playing gambling games such as roulette, poker, bingo, keno, lotto and various other games, and have historically been constructed in a slot machine format typically including a pay board wherein the winning pay-out combinations are displayed; a play section in which electronic or mechanical reels, card-playing indicia or other gaming objects are displayed.

The disclosed standalone video terminal can be adapted to conduct wireless telephone calls, using any known wireless phone system such as a Global System for Mobile Communications ("GSM") system, Code Division Multiple Access ("CDMA") system, Cellular Digital Packet Data ("CDPD") system and Time Division Multiple Access ("TDMA") system. Other wireless phone systems can include Bluetooth and the many forms of 802.11 wireless broadband, like 802.11a, 802.11b, 802.11g, etc. Other embodiments include Voice over IP ("VoIP") type streaming data communications that can simulate circuit switched phone calls. Ear bud can be used to listen to phone calls and other sound messages and built in microphone can be used to speak into and input sound messages to device.

In one embodiment the invention the customers can be requested to verify their identity prior to the provision of the service. Preferably, the user verifies the identity by providing a biometric verification, such as a fingerprint, for example. The standalone video terminal can include a biometric system for assisting a customer in providing a biometric reading, such as a touch-screen application for capturing a fingerprint of the user; and feedback means for providing the user with an indication of a measurement has been captured. In the disclosed invention, the biometric identity verification can be realized similar to U.S. Pat. No. 7,493,496, see FIG. 4, or by alternative methods.

Furthermore, the disclosed standalone video terminal can be connected to the institutional multi-frame computer (e.g. public organization, airport, college, etc.) for use by customers in connection with registration, payment of fees and similar tasks.

The disclosed device and the system may also include encryption and anonymized data transmission means for providing the anonymized version of the biometric data measured, for example.

Various alternative applications and its arrangements can be incorporated in the invention.

Although various preferred embodiments of the present invention have been described in detail, it will be appreciated by those skilled in the art that variations may be made without departing from the spirit of the invention or the scope of the claims.

What is claimed is:

1. An interactive multimedia networking system for rural territories, comprising:
   at least one kiosk connected to a plurality of remotely located representatives/operators by a network; the plurality of operators consists of operators located in different remote places,
   the kiosk providing a public customer with a catalog of information and services,
   the kiosk having a kiosk's keyboard, a kiosk's touch screen, a kiosk's camera, a kiosk's microphone, a kiosk's credit card reader, the screen displaying the catalog of information and services available at the kiosk;

upon selection of a first service on the display screen, the first service is $S_i$ service selected from 1 ... N services available from the catalog, and a first operator appears on the screens; the first operator remains on the screen throughout the first service;

a set of documents and a set of instructions appear on the display; the set of documents and instructions being downloaded to kiosk using a network;

the first operator's station comprising a first operator from the plurality of operators, a first operator's computer, an interface allowing control the customer's access to the kiosk, a first operator's camera, a first operator's microphone;

the first operator $R_j$ being one of 1 ... j ... M operators, performing the first service;

the kiosk's camera provides the first operator with an image of the customer;

the network provides a secure communication between the kiosk and all operator's stations;

when the customer is completing documents required for the first selected service, the first operator is able to see a progress via the operator's interface; said documents being shared on the kiosk's screen and the operator's screen; wherein "shared" means simultaneous completing of the same document by the first operator and the customer, both operator and customer being able to insert information into the document;

the customer selects a second service $S_n$ selected from 1 ... N services; the second operator specializing in the second service appears on the kiosk screen; the second operator located at a different place than the first operator; the second operator $R_i$ being one of 1 ... i ... K plurality of operators, performing the second service;

a second set of documents and instructions is downloaded using the network; the second operator is helping the customer to complete the second set of documents using vocal instructions and a second shared document; wherein "shared" means simultaneous completing of the same document by the second operator and the customer, both being able to insert information in the second documents;

the system allowing the customer to complete a multitude of operations using a remote assistance from a multitude of the specialized operators.

2. The interactive multimedia networking system of claim 1, where the services are information, assistance and sale.

3. The interactive multimedia networking system of claim 1, further comprising a list of providers for selected products or services, and the customer uses a criterion to select the provider.

4. The interactive multimedia networking system of claim 3, wherein the criterion is a cost.

5. The interactive multimedia networking system of claim 3, wherein the criterion is a distance from a current customer's location.

6. The interactive multimedia networking system of claim 1, wherein the service is a Governmental service.

7. The interactive multimedia networking system of claim 6, wherein services are provided during hours, when a Government office is closed.

8. The interactive multimedia networking system of claim 1, wherein the kiosk further comprises means for sending and receiving an electronic document to the customer via email or SMS.

9. The interactive multimedia networking system of claim 1, wherein the kiosk further comprises means for a document signing by the customer.

10. The interactive multimedia networking system of claim 1, wherein the kiosk further comprises a video identification, including a biometrical identification.

11. The interactive multimedia networking system of claim 1, wherein the kiosk further comprises a gesture recognition and a gesture control means.

12. The interactive multimedia networking system of claim 1, wherein the kiosk further comprises means for storage of a data, the data being associated with a particular customer, the data being protected by a password; the data including documents that the customer completed and submitted regarding a particular service.

13. The interactive multimedia networking system of claim 1, wherein the data located at a remote server.

14. The interactive multimedia networking system of claim 1, wherein the kiosk further comprises an autonomous emergency response means.

15. The interactive multimedia networking system of claim 1, further comprising an option to provide the second service via the first operator's station; the option to connect the customer to the second operator's station via the first operator's station; and both the first and the second operators appear on the screen with three-way communication between the customer and the first operator and the second operator.

16. The interactive multimedia networking system of claim 15, wherein both the first and second operator's image are displayed on the kiosk's screen, and the customer performs teleconference with two operators at the same time.

17. The interactive multimedia networking system of claim 16, wherein both the first operator, the second operator, and the customer share a document displayed on the screen and insert changes in the document simultaneously.

18. The interactive multimedia networking system of claim 1, wherein the service is a ticket booking.

19. The interactive multimedia networking system of claim 1, further comprising WiFi transceiver; and a second customer different from the first customer receiving a third service different from the first and second services from the kiosk via WiFi connection.

20. The interactive multimedia networking system of claim 1, wherein said kiosk has the shape of a thin flattened, vertically extended box, tilted in a direction away from the customer to provide an improved view of all images on the screen.

* * * * *